(12) United States Patent
Do et al.

(10) Patent No.: US 8,024,185 B2
(45) Date of Patent: Sep. 20, 2011

(54) VOCAL COMMAND DIRECTIVES TO COMPOSE DYNAMIC DISPLAY TEXT

(75) Inventors: Lydia M. Do, Raleigh, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 11/869,987

(22) Filed: Oct. 10, 2007

(65) Prior Publication Data
US 2009/0099850 A1 Apr. 16, 2009

(51) Int. Cl.
*G10L 15/00* (2006.01)
(52) U.S. Cl. ...... 704/235; 704/275; 709/205; 348/14.09
(58) Field of Classification Search ................ 704/235, 704/275; 709/205; 348/14.09
See application file for complete search history.

(56) References Cited

U.S. PATENT DOCUMENTS

| | | |
|---|---|---|
| 3,873,769 A | 3/1975 | Cotter |
| 4,393,410 A | 7/1983 | Ridge et al. |
| 4,577,058 A | 3/1986 | Collins |
| 4,771,336 A | 9/1988 | Ohtorii |
| 5,574,577 A | 11/1996 | Wally, Jr. et al. |
| 5,630,168 A | 5/1997 | Rosebrugh et al. |
| 5,838,326 A | 11/1998 | Card et al. |
| 6,014,662 A | 1/2000 | Moran et al. |
| 6,561,678 B2 | 5/2003 | Loughrey |
| 6,571,279 B1 | 5/2003 | Herz et al. |
| 6,636,831 B1 | 10/2003 | Profit, Jr. et al. |
| 6,806,636 B2 | 10/2004 | Kang et al. |
| 6,839,669 B1 | 1/2005 | Gould et al. |
| 6,850,252 B1 | 2/2005 | Hoffberg |
| 6,970,821 B1 | 11/2005 | Shambaugh et al. |
| 6,982,649 B2 | 1/2006 | Blum et al. |

(Continued)

FOREIGN PATENT DOCUMENTS

DE 19804028 A1 8/1998

(Continued)

OTHER PUBLICATIONS

Microsoft: "Microsoft Launches New Product Category: Surface Computing Comes to Life in Restaurants, Hotels, Retail Locations and Casino Resorts" Microsoft Website, [Online] May 29, 2007, p. 13, XP00251268, Carlsbad, California, US.

(Continued)

*Primary Examiner* — Daniel Abebe
(74) *Attorney, Agent, or Firm* — VanLeeuwen & VanLeeuwen; Jeffrey S. LaBaw

(57) ABSTRACT

Methods, apparatus, products are disclosed for displaying speech for a user of a surface computer, the surface computer comprising a surface, the surface computer capable of receiving multi-touch input through the surface and rendering display output on the surface, that include: registering, by the surface computer, a plurality of users with the surface computer; allocating, by the surface computer to each registered user, a portion of the surface for interaction between that registered user and the surface computer; detecting, by the surface computer, a speech utterance from one of the plurality of users; determining, by the surface computer using a speech engine, speech text in dependence upon the speech utterance; creating, by the surface computer, display text in dependence upon the speech text; and rendering, by the surface computer, the display text on at least one of the allocated portions of the surface.

15 Claims, 6 Drawing Sheets

U.S. PATENT DOCUMENTS

| | | | |
|---|---|---|---|
| 6,999,932 B1 | 2/2006 | Zhou | |
| 7,035,804 B2* | 4/2006 | Saindon et al. | 704/271 |
| 7,174,056 B2 | 2/2007 | Silverbrook et al. | |
| 7,209,124 B2 | 4/2007 | Hunt et al. | |
| 7,830,408 B2* | 11/2010 | Asthana et al. | 348/14.08 |
| 2002/0191072 A1* | 12/2002 | Henrikson | 348/14.08 |
| 2003/0066073 A1 | 4/2003 | Rebh | |
| 2003/0078840 A1 | 4/2003 | Strunk et al. | 705/14 |
| 2003/0160862 A1 | 8/2003 | Charlier et al. | |
| 2003/0204403 A1 | 10/2003 | Browning | 704/270 |
| 2004/0019482 A1 | 1/2004 | Holub | |
| 2004/0051644 A1 | 3/2004 | Tamayama et al. | |
| 2004/0199597 A1 | 10/2004 | Libbey et al. | |
| 2004/0201871 A1 | 10/2004 | Risheq | |
| 2004/0237033 A1 | 11/2004 | Woolf et al. | |
| 2005/0110964 A1 | 5/2005 | Bell et al. | |
| 2005/0149364 A1 | 7/2005 | Ombrellaro | |
| 2005/0154595 A1 | 7/2005 | Bodin | |
| 2005/0182680 A1 | 8/2005 | Jones, III | |
| 2005/0183023 A1 | 8/2005 | Maruyama et al. | |
| 2006/0001650 A1 | 1/2006 | Robbins et al. | |
| 2006/0036944 A1 | 2/2006 | Wilson | |
| 2006/0073891 A1 | 4/2006 | Holt | |
| 2006/0117669 A1 | 6/2006 | Baloga et al. | |
| 2006/0126128 A1 | 6/2006 | Ahmed et al. | |
| 2006/0132501 A1 | 6/2006 | Nonaka et al. | |
| 2006/0146034 A1 | 7/2006 | Chen et al. | |
| 2006/0176524 A1 | 8/2006 | Willrich | |
| 2006/0203208 A1 | 9/2006 | Thielman et al. | |
| 2006/0204030 A1 | 9/2006 | Kogure et al. | |
| 2006/0267966 A1 | 11/2006 | Grossman et al. | |
| 2006/0287963 A1 | 12/2006 | Steeves et al. | |
| 2006/0294247 A1 | 12/2006 | Hinckley et al. | 709/228 |
| 2007/0005500 A1 | 1/2007 | Steeves et al. | |
| 2007/0026372 A1 | 2/2007 | Huelsbergen | |
| 2007/0033637 A1 | 2/2007 | Yami et al. | 726/2 |
| 2007/0055929 A1 | 3/2007 | Giannetti et al. | |
| 2007/0079249 A1 | 4/2007 | Pall et al. | 715/758 |
| 2007/0083666 A1 | 4/2007 | Apelbaum | |
| 2007/0143103 A1* | 6/2007 | Asthana et al. | 704/200 |
| 2007/0143624 A1 | 6/2007 | Steeves | |
| 2007/0143690 A1 | 6/2007 | Nakajima et al. | |
| 2007/0156811 A1* | 7/2007 | Jain et al. | 709/204 |
| 2007/0201745 A1 | 8/2007 | Wang et al. | |
| 2007/0220444 A1 | 9/2007 | Sunday et al. | |
| 2007/0288599 A1 | 12/2007 | Saul et al. | 709/218 |
| 2008/0028321 A1 | 1/2008 | Weksler et al. | |
| 2008/0066014 A1 | 3/2008 | Misra | |
| 2008/0088593 A1 | 4/2008 | Smoot | |
| 2008/0122803 A1 | 5/2008 | Izadi et al. | |
| 2008/0127302 A1 | 5/2008 | Qvarfordt et al. | |
| 2008/0168403 A1 | 7/2008 | Westerman et al. | |
| 2008/0192059 A1 | 8/2008 | Kennedy | |
| 2008/0198138 A1 | 8/2008 | McFarlane et al. | 345/173 |
| 2008/0214233 A1 | 9/2008 | Wilson et al. | 455/55.1 |
| 2008/0270230 A1 | 10/2008 | Hendrickson et al. | |
| 2008/0281851 A1 | 11/2008 | Izadi et al. | 707/102 |
| 2009/0002327 A1 | 1/2009 | Wilson et al. | |
| 2009/0085877 A1 | 4/2009 | Chang et al. | 345/173 |
| 2009/0113294 A1 | 4/2009 | Sanghavvi et al. | |
| 2009/0138723 A1 | 5/2009 | Nyang et al. | |
| 2009/0150983 A1 | 6/2009 | Saxena et al. | |
| 2009/0328163 A1 | 12/2009 | Preece | |

FOREIGN PATENT DOCUMENTS

| | | |
|---|---|---|
| EP | 0450196 A1 | 4/1990 |
| EP | 0543566 A2 | 11/1992 |
| EP | 1 315 071 A | 5/2003 |
| EP | 1 621 989 A2 | 2/2006 |
| EP | 1621989 | 2/2006 |
| JP | 2000/148396 | 5/2000 |
| JP | 2000 148396 A | 5/2000 |
| WO | WO 01/01391 A | 1/2001 |
| WO | WO 01/01391 A1 | 1/2001 |
| WO | WO 03/036415 A2 | 5/2003 |

OTHER PUBLICATIONS

Bohte, et al.; "Market-Based Recommendation: Agents that Compete for Consumer Attention"; Nov. 2004; pp. 420-448; vol. 4, No. 4; ACM Transactions on Internet Technology; Broadway, New York.

Lemon, et al.; "Multithreaded Context for Robust Conversational Interfaces: Context-Sensitive Speech Recognition and Interpretation of Corrective Fragments"; Sep. 2004; pp. 241-267; vol. 11, No. 3; ACM Transactions on Computer-Human Interaction; Broadway, New York.

Gabriel, et al.; "Conscientious Software"; Oct. 2006; pp. 433-450; ACM 1-59593-348-4/06/0010; Sun Microsystems, Inc.; Portland, Oregon.

McTear; "Spoken Dialogue Technology: Enabling the Conversational User Interface"; Mar. 2002; pp. 90-169; vol. 34, No. 1; ACM Computing Surveys.

Bollacker, et al.; "A System for Automatic Personalized Tracking of Scientific Literature on the Web"; NEC Research Institute; pp. 105-113; Princeton, NJ.

Jagadish, et al.; "Making Database Systems Usable"; SIGMOD'07; Jun. 12-14, 2007; pp. 13-24; ACM 978-1-59593-686-8/07/0006; Beijing, China.

Marshall, et al.; Exploring the Relationship Between Personal and Public Annotations; JCDL'04; Jun. 7-11, 2004; pp. 349-357; ACM 1-58113-832-6/04/0006; Tucson, Arizona.

Ashdown, et al.; "Escritoire: A Personal Projected Display"; IEEE Multimedia, vol. 12, Issue 1; Jan.-Mar. 2005; pp. 34-42.

Athanasopoulos, et al.; Enhanced CAPTCHAs: Using Animation to Tell Humans and Computers Apart; 2006; pp. 97-108; CMS 2006-LNCS 4237; IFIP.

Microsoft: "Microsoft Launches New Product Category: Surface Computing Comes to Life in Restaurants, Hotels, Retail Locations and Casino Resorts" Microsoft Website, [Online] May 29, 2007, p. 13, XP00251268, Carlsbad, California, US.

Office Action, U.S. Appl. No. 11/869,313, USPTO Mail Date Aug. 5, 2010.

Office Action, U.S. Appl. No. 11/868,766, USPTO Mail Date Aug. 6, 2010.

Office Action, U.S. Appl. No. 11/868,513, USPTO Mail Date Aug. 6, 2010.

Bohte, et al.; "Market-Based Recommendation: Agents that Compete for Consumer Attention"; Nov. 2004; pp. 420-448; vol. 4, No. 4; ACM Transactions on Internet Technology; Broadway, New York.

Lemon, et al.; "Multithreaded Context for Robust Conversational Interfaces: Context-Sensitive Speech Recognition and Interpretation of Corrective Fragments"; Sep. 2004; pp. 241-267; vol. 11, No. 3; ACM Transactions on Computer-Human Interaction; Broadway, New York.

Gabriel, et al.; "Conscientious Software"; Oct. 2006; pp. 433-450; ACM 1-59593-348-4/06/0010; Sun Microsystems, Inc.; Portland, Oregon.

McTear; "Spoken Dialogue Technology: Enabling the Conversational User Interface"; Mar. 2002; pp. 90-169; vol. 34, No. 1; ACM Computing Surveys.

Athanasopoulos, Elias; Antonatos, Spiros, "Enhanced CAPTCHAs: Using Animation to tell Humans and Computers Apart", IFIP 2006, pp. 97-108.

Izadi et al. (Dynamo: A public interactive surface supporting cooperative sharing and exchange of media; pp. 1-9; copyright 2003).

Office Action, U.S. Appl. No. 11/868,216, USPTO Mail Date Aug. 20, 2010.

Office Action, U.S. Appl. No. 11/950,872, USPTO Mail Date Oct. 15, 2010.

Fetzer, C., Kaefer, K., Augsten, T., Meusel, R., Kanitz, D., Stoff, T., Becker, T., Holt, C. And Baudisch, P. Multitoe: High—Precision Interation with Back-Projected Floors Based on High-Resolution Multi-Touch Input to appear in Proceedings of UIST 2010, New York, Ny, Oct. 3-6, 2010, 10 pages.

Final Office Action, U.S. Appl. No. 11/869,313, USPTO Mail Date Dec. 10, 2010.

Office Action, U.S. Appl. No. 11/868,513, USPTO Mail Date Dec. 10, 2010.

Office Action, U.S. Appl. No. 11/869,987, USPTO Mail Date Nov. 30, 2010.
Final Office Action, U.S. Appl. No. 11,868,766, USPTO Mail Date Dec. 9, 2010.
Office Action, U.S. Appl. No. 11/868,474, USPTO Mail Date Oct. 29, 2010.
Office Action, U.S. Appl. No. 11/869,313, Jan. 28, 2011.
Final Office Action for co-pending U.S. Appl. No. 11/868,216, mailed Mar. 3, 2011, 21 pages.
Final Office Action for co-pending U.S. Appl. No. 11/868,474, mailed Mar. 1, 2011, 25 pages.
Final Office Action for U.S. Appl. No. 11/869,313, mailed May 24, 2011, 21 pages..
Gronbaek et al., "iGameFloor—A Platform for Co-Located Collaborative Games," ACE'07, Jun. 13-15, 2007.
Final Office Action for U.S. Appl. No. 11/868,513, mailed Apr. 15, 2011, 16 pages.
Office Action for U.S. Appl. No. 11/868,766, mailed Apr. 14, 2011, 19 pages.
Office Action for U.S. Appl. No. 11/868,474, mailed Jun. 23, 2011, 18 pages.
Office Action for U.S. Appl. No. 07/282,011, mailed Jul. 28, 2011, 14 pages.
Final Office Action for U.S. Appl. No. 11/868,766, mailed Aug. 4, 2011, 19 pages.

* cited by examiner

VOCAL COMMAND DIRECTIVES TO COMPOSE DYNAMIC DISPLAY TEXT

BACKGROUND OF THE INVENTION

1. Field of the Invention

The field of the invention is data processing, or, more specifically, methods, apparatus, and products for displaying speech for a user of a surface computer.

2. Description of Related Art

Multi-touch surface computing is an area of computing that has made tremendous advancements over the last few years. Multi-touch surface computing allows a user to interact with a computer through a surface that is typically implemented as a table top. The computer renders a graphical user interface ('GUI') on the surface and users may manipulate GUI objects directly with their hands using multi-touch technology as opposed to using traditional input devices such as a mouse or a keyboard. In such a manner, the devices through which users provide input and receive output are merged into a single surface, which provide an intuitive and efficient mechanism for users to interact with the computer. As surface computing becomes more ubiquitous in everyday environments, readers will appreciate advancements in how users may utilize surface computing to intuitively and efficiently perform tasks that may be cumbersome using traditional input devices such as a keyboard and mouse.

SUMMARY OF THE INVENTION

Methods, apparatus, products are disclosed for displaying speech for a user of a surface computer, the surface computer comprising a surface, the surface computer capable of receiving multi-touch input through the surface and rendering display output on the surface, that include: registering, by the surface computer, a plurality of users with the surface computer; allocating, by the surface computer to each registered user, a portion of the surface for interaction between that registered user and the surface computer; detecting, by the surface computer, a speech utterance from one of the plurality of users; determining, by the surface computer using a speech engine, speech text in dependence upon the speech utterance; creating, by the surface computer, display text in dependence upon the speech text; and rendering, by the surface computer, the display text on at least one of the allocated portions of the surface.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
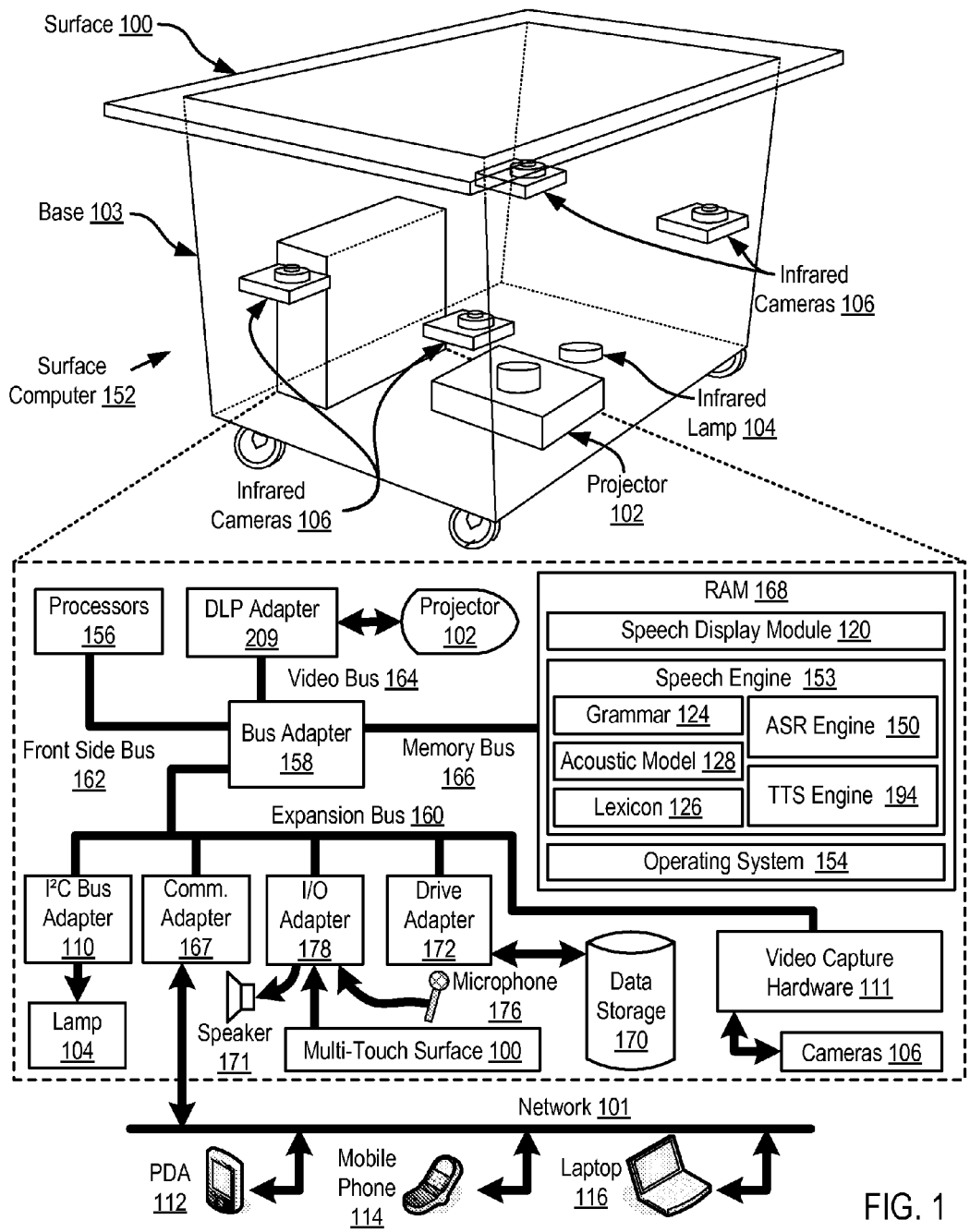
FIG. 1 sets forth a functional block diagram of an exemplary surface computer capable of displaying speech for a user according to embodiments of the present invention.

Exemplary methods, apparatus, and products for displaying speech for a user of a surface computer in accordance with the present invention are described with reference to the accompanying drawings, beginning with FIG. 1. FIG. 1 sets forth a functional block diagram of an exemplary surface computer (152) capable of displaying documents to a plurality of users according to embodiments of the present invention. The exemplary surface computer (152) of FIG. 1 includes a surface (100) mounted atop a base (103) that houses the other components of the surface computer (152). The surface (100) may be implemented using acrylic, glass, or other materials as will occur to those of skill in the art. In addition to the computing functionality provided by the surface computer (152), the surface (100) of FIG. 1 may also serve as a table top for a coffee table, dining table, a conference table, or some other table as will occur those of skill in the art. Examples of a surface computer that may be improved for displaying speech for a user according to embodiments of the present invention may include the Microsoft Surface™ and the ROSIE Coffee Table by Savant.

The exemplary surface computer (152) of FIG. 1 is capable of receiving multi-touch input through the surface (100) and rendering display output on the surface (100). Multi-touch input refers to the ability of the surface computer (152) to recognize multiple simultaneous points of contact between objects and the surface (100). These objects may include hands, fingers, portable electronic devices, papers, cups, plates, or any other object as will occur to those of skill in the art. Such recognition may include the position and pressure or degree of each point of contact, which allows gestures and interaction with multiple fingers or hands through intuitive gestures. Depending largely on the size of the surface, a surface computer typically supports interaction with more than one user or object simultaneously. In the example of FIG. 1, the surface computer (100) supports interaction with a plurality of users.

In the example of FIG. 1, the exemplary surface computer (152) receives multi-touch input through the surface (100) by reflecting infrared light off of objects on top of the surface (100) and capturing the reflected images of the objects using multiple infrared cameras (106) mounted inside the base (103). Using the reflected infrared images, the surface computer (100) may then perform pattern matching to determine the type of objects that the images represent. The objects may include fingers, hands, portable electronic devices, papers, and so on. The infrared light used to generate the images of the objects is provided by an infrared lamp (104) mounted to the base (103) of the surface computer (152). Readers will note that infrared light may be used to prevent any interference with users' ability to view the surface (100) because infrared light is typically not visible to the human eye.

Although the exemplary surface computer (152) of FIG. 1 above receives multi-touch input through the surface (100) using a system of infrared lamps and cameras, readers will note that such implementation are for explanation only and not for limitation. In fact, other embodiments of a surface computer for displaying documents to a plurality of users according to embodiments of the present invention may use other technologies as will occur to those of skill in the art such as, for example, frustrated total internal reflection. Frustrated total internal reflection refers to a technology that disperses light through a surface using internal reflection. When an object comes in contact with one side of the surface, the dispersed light inside the surface scatters onto light detectors on the opposite side of the surface, thereby identifying the point at which the object touched the surface. Other technologies may include dispersive signal technology and acoustic pulse recognition.

In the example of FIG. 1, the surface computer (152) renders display output on the surface (100) using a projector (102). The projector (102) renders a GUI on the surface (100) for viewing by the users. The projector (102) of FIG. 1 is implemented using Digital Light Processing ('DLP') technology originally developed at Texas Instruments. Other technologies useful in implementing the projector (102) may include liquid crystal display ('LCD') technology and liquid crystal on silicon ('LCOS') technology. Although the exemplary surface computer (152) of FIG. 1 above displays output on the surface (100) using a projector (102), readers will note that such an implementation is for explanation and not for limitation. In fact, other embodiments of a surface computer for displaying documents to a plurality of users according to embodiments of the present invention may use other technologies as will occur to those of skill in the art such as, for example, embedding a flat panel display into the surface (100).

The surface computer (152) of FIG. 1 includes one or more computer processors (156) as well as random access memory ('RAM') (168). The processors (156) are connected to other components of the system through a front side bus (162) and bus adapter (158). The processors (156) are connected to RAM (168) through a high-speed memory bus (166) and to expansion components through an extension bus (168).

Stored in RAM (168) is a speech display module (120), software that includes computer program instructions for displaying speech for a user of the surface computer (152) according to embodiments of the present invention. The speech display module (120) operates generally for displaying speech for a user of the surface computer (152) according to embodiments of the present invention by: registering a plurality of users with the surface computer; allocating, to each registered user, a portion of the surface for interaction between that registered user and the surface computer; detecting a speech utterance from one of the plurality of users; determining, using a speech engine, speech text in dependence upon the speech utterance; creating display text in dependence upon the speech text; and rendering the display text on at least one of the allocated portions of the surface. Readers will note that in a preferred embodiment, the display surface (100) is sufficiently large to accommodate several individuals seated around the display surface such as, for example, when the surface computer serves as a conference table.

Also stored in RAM (168) is a speech engine (153). The speech engine (153) of FIG. 1 is a software module, although it may be implemented as specialized hardware also, that does the work of recognizing and synthesizing human speech. The speech engine (153) implements speech recognition by use of a further module referred to in this specification as an automated speech recognition ('ASR') engine (150). The speech engine (153) carries out speech synthesis by use of a further module referred to in this specification as a text-to-speech ('TTS') engine (194). As shown in FIG. 1, a speech engine (153) may be installed locally in the surface computer (152) itself, but readers will note that the speech engine (153) may be installed remotely with respect to the surface computer (152) across the data communications network (100) in a voice server (not shown). Because the speech engine (153) in the example of FIG. 1 is installed locally on the surface computer (152), the speech engine (153) provides speech recognition and synthesis services to the speech display module (120) through an application programming interface ('API') exposed by the speech engine (153). When the speech engine (153) is located remotely across a network from the surface computer (152), the speech display module (120) may obtain speech recognition and speech synthesis services from a voice server located remotely across a network through calls to an API exposed by a thin voice services client installed on the surface computer. The thin voice services client in turn accesses the speech engine on the voice server over the network (101) and returns the results to the speech display module (120).

In the example of FIG. 1, the speech engine (153) includes a grammar (124), a lexicon (126), and a language-specific acoustic model (128). The language-specific acoustic model (128) is a data structure, a table or database, for example, that associates Speech Feature Vectors ('SFV') with phonemes representing, to the extent that it is practically feasible to do so, all pronunciations of all the words in a human language. The lexicon (126) is an association of words in text form with phonemes representing pronunciations of each word; the lexicon effectively identifies words that are capable of recognition by an ASR engine. The grammar (124) communicates to the ASR engine (150) the words and sequences of words that currently may be recognized. For precise understanding, readers will note the distinction between the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same. Narrowing the set of eligible words to use during speech recognition with a grammar is useful to speed up the speech recognition process. In some embodiments, however, readers will appreciate that the speech engine (153) may not utilize a grammar (124).

In the example of FIG. 1, the speech display module (120) receives a speech utterance from a user through one or more microphones (176) and passes the speech utterance along to the ASR engine (150) for recognition. The ASR engine (150) receives speech utterance for recognition in the form of at least one digitized word and uses frequency components of the digitized words to derive a Speech Feature Vector. An SFV may be defined, for example, by the first twelve or thirteen Fourier or frequency domain components of a sample of digitized speech. The ASR engine can use the SFV to infer phonemes for the word from the language-specific acoustic model (128). The ASR engine (150) then uses the phonemes to find the word in the lexicon (126). The Text To Speech ('TTS') Engine (194) accepts text as input and returns the same text in the form of digitally encoded speech, for use in providing speech as prompts for and responses to users of the surface computer (152).

The surface computer may digitally encode the speech utterance according to industry standard codecs, including those used for Distributed Speech Recognition ('DSR') as such. The term 'codec' refers to methods for 'COding/DE-Coding' speech. The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. The surface computer may digitally encode speech utterance for display speech to a user according to embodiments of the present invention using any codec as will occur to those of skill of the art, including, for example:

AMR (Adaptive Multi-Rate Speech coder)
 ARDOR (Adaptive Rate-Distortion Optimized sound codeR),
 Dolby Digital (A/52, AC3),
 DTS (DTS Coherent Acoustics),
 MP1 (MPEG audio layer-1),
 MP2 (MPEG audio layer-2) Layer 2 audio codec (MPEG-1, MPEG-2 and non-ISO MPEG-2.5),
 MP3 (MPEG audio layer-3) Layer 3 audio codec (MPEG-1, MPEG-2 and non-ISO MPEG-2.5),
 Perceptual Audio Coding,
 FS-1015 (LPC-10),
 FS-1016 (CELP),
 G.726 (ADPCM),
 G.728 (LD-CELP),
 G.729 (CS-ACELP),
 GSM,
 HILN (MPEG-4 Parametric audio coding), and
 others as may occur to those of skill in the art.

When grammars are used in displaying speech for a user of a surface computer according to embodiments of the present invention, such grammars may be expressed in any format supported by an ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine which words presently can be recognized. In the example above, rule expansions includes conjunction and disjunction, and the vertical bars '|' mean 'or.' An ASR engine processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"
 "telephone martha this afternoon,"
 "remind me to call chris tomorrow," and
 "remind me to phone pete today."

The exemplary grammar above is implemented using static grammar rules. Readers will note, however, that grammars useful according to embodiments of the present invention may also be implemented using dynamically defined grammar rules that are specified by the grammar as rules that are not to be processed by the ASR engine until after at least one static rule has been matched. Such dynamic rules are dynamically defined at run time as a new static rule in dependence upon a matched value of a previously matched static rule. The following grammar, for example:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>
``` uses a double-bracket syntax and a parameter list to specify the <<brand>> rule as a dynamic rule that is not to be processed by an ASR until after the <item> rule has been matched. In this <<brand>> example, the static <command> rule contains a rule reference:

<<brand>>(<item>)

that is specified by the grammar's double-bracket syntax to be a dynamic rule reference to the dynamic <<brand>> rule. The dynamic rule reference <<brand>> is characterized by a static rule parameter list (<item>) that includes a one static rule reference <item> specifying a static rule, here named <item>, required to be matched by the ASR engine before processing the dynamic rule <<brand>>. The parameter list (<item>) is attached to the <<brand>> rule in a manner reminiscent of the parameter list in a traditional C-style function call. In this example, there is only one entry in the parameter list, <item>, but the list could contain any number of rule references. The <command> and <item> rules are said to be 'static' rules in that they are traditional rules of a voice recognition grammar. That is, the term 'static' is used in this specification to refer to any rule of a grammar that is not a dynamic rule according to embodiments of the present invention.

The dynamic <<brand>> rule is initially defined in this example grammar only by a URL:

<<brand>>=http://groceries.com/brand.jsp

The URL identifies a computer resource capable of dynamically defining at run time the dynamic <<brand>> rule of the grammar as a new static rule in dependence upon matched value from the <item> rule, the rule required to be matched before the dynamic rule is processed. In this example, the computer resource so identified is a Java Server Page ('JSP') located at http://groceries.com. The JSP is a computer resource that is programmed to define the dynamic <<brand>> rule of the grammar as a new static rule in dependence upon matched value from the <item> rule. The ASR engine expands the definition of the <<brand>> rule with the results of the match from the <item> rule and provides the expansion to the JSP page to return a new static rule. In this way, the ASR engine may dynamically define the dynamic rule at run time as a new static rule by expanding the definition of the dynamic rule with a matched value of the referenced static <item> rule. If the <item> rule were matched with "peppers," for example, then the definition of the dynamic <<brand>> rule may be expanded as:

http://groceries.com/brand.jsp?item="peppers"

And the new static rule returned from the JSP page may be, for example:

<brand>=brand a|brand b|brand c

If the <item> rule were matched with "tomatoes," for example, then the definition of the dynamic <<brand>> rule may be expanded as:

http://groceries.com/brand.jsp?item="tomatoes"

And the new static rule returned from the JSP page may be, for example:

<brand>=brand f|brand g|brand h

If the <item> rule were matched with "toothpaste," for example, then the definition of the dynamic <<brand>> rule may be expanded as:

http://groceries.com/brand.jsp?item="toothpaste"

And the new static rule returned from the JSP page may be, for example:

<brand>=colgate|palmolive|crest

And so on—with a different definition of the new static rule possible for each matched value of the referenced static <item> rule.

Also stored in RAM (168) is an operating system (154). Operating systems useful for applying displaying speech for a user of a surface computer according to embodiments of the present invention may include or be derived from UNIX™, Linux™, Microsoft Vista™, Microsoft XP™, AIX™, IBM's i5/OS™, and others as will occur to those of skill in the art. The operating system (154) and the speech display module (120) in the example of FIG. 1 are shown in RAM (168), but many components of such software typically are stored in non-volatile memory also, such as, for example, on a disk drive (170).

The surface computer (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computing devices for displaying speech for a user of a surface computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory), RAM drives, and so on, as will occur to those of skill in the art.

The example surface computer (152) of FIG. 1 includes one or more input/output ('I/O') adapters (178). I/O adapters implement user-oriented input/output through, for example, software drivers and computer hardware for controlling output to devices such as computer display screens or speakers (171), as well as user input from user input devices such as, for example, microphone (176) for collecting speech input. The example surface computer (152) of FIG. 1 also includes a Digital Light Processing adapter (209), which is an example of an I/O adapter specially designed for graphic output to the projector (102). Video adapter (209) is connected to processor (156) through a high speed video bus (164), bus adapter (158), and the front side bus (162), which is also a high speed bus.

The exemplary surface computer (152) of FIG. 1 includes video capture hardware (111) that converts image signals received from the infrared cameras (106) to digital video for further processing, including pattern recognition. The video capture hardware (111) of FIG. 1 may use any number of video codec, including for example codec described in the Moving Picture Experts Group ('MPEG') family of specifications, the H.264 standard, the Society of Motion Picture and Television Engineers' 421M standard, or any other video codec as will occur to those of skill in the art. Although the video capture hardware (111) of FIG. 1 is depicted separately from the infrared cameras (106), readers will note that in some embodiment the video capture hardware (111) may be incorporated into the cameras (106). In such embodiments, the infrared camera (106) may connect to the other components of the surface computer through a Universal Serial Bus ('USB') connection, FireWire connection, or any other data communications connection as will occur to those of skill in the art.

The exemplary surface computer (152) of FIG. 1 also includes an Inter-Integrated Circuit ('I$^2$C') bus adapter (110). The I$^2$C bus protocol is a serial computer bus protocol for connecting electronic components inside a computer that was first published in 1982 by Philips. I$^2$C is a simple, low-bandwidth, short-distance protocol. Through the I$^2$C bus adapter (110), the processors (156) control the infrared lamp (104). Although the exemplary surface computer (152) utilizes the I$^2$C protocol, readers will note this is for explanation and not for limitation. The bus adapter (110) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

The exemplary surface computer (152) of FIG. 1 also includes a communications adapter (167) that couples the surface computer (152) for data communications with other computing devices through a data communications network (101). Such a data communication network (100) may be implemented with external buses such as a Universal Serial Bus ('USB'), or as an Internet Protocol ('IP') network or an Ethernet™ network, for example, and in other ways as will occur to those of skill in the art. Communications adapters implement the hardware level of data communications through which one computer sends data communications to another computer, directly or through a data communications network. Examples of communications adapters useful for displaying speech for a user of a surface computer according to embodiments of the present invention include modems for wired dial-up communications, Ethernet (IEEE 802.3) adapters for wired data communications network communications and 802.11 adapters for wireless data communications network communications.

FIG. 1 illustrates several computing devices (112, 114, 116) connected to the surface computer (152) for data communications through a network (101). Data communication may be established when the Personal Digital Assistant (112), the mobile phone (114), and the laptop (116) a placed on top of the surface (100). Through the images of the computing devices (112, 114, 116), the surface computer (152) may identify each device (112, 114, 116) and configure a wireless data communications connections with each device. The contents of any files contained in the devices (112, 114, 116) may be retrieved into the surface computer's memory and rendered on the surface (100) for interaction with surface computer's users. Similarly, the contents rendered on the surface (100) of the surface computer (152) may be transmitted through the wireless data communications connection with each device and stored in each device's computer memory.

The arrangement of networks and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

For further explanation, FIGS. 2A-E set forth line drawings illustrating exemplary surfaces useful in displaying speech for a user of a surface computer according to embodiments of the present invention. The surface (100) of FIGS. 2A-E is comprised in a surface computer (152). The surface computer (152) is capable of receiving multi-touch input through the surface (100) and rendering display output on the surface (100).

In the examples of FIGS. 2A-E, several users (200-206) are positioned adjacent to the surface computer (152) for interaction through the surface (100). Each user (200-206) may choose their respective position around the surface computer (152) by choosing a chair in which to sit around the surface computer (152) or by merely standing near an edge of the surface (100). After the users (200-206) choose a location near the surface (100), the surface computer (152) registers the users (200-206) with the surface computer (152) and assigns a portion (210) of the surface (100) to each registered user (200-206) for interaction between that registered user (200-206) and the surface computer (152). Registering the users (200-206) with the surface computer (152) and allocating a portion (210) of the surface (100) to each registered user (200-206) is discussed in more detail below.

Figure 2A:
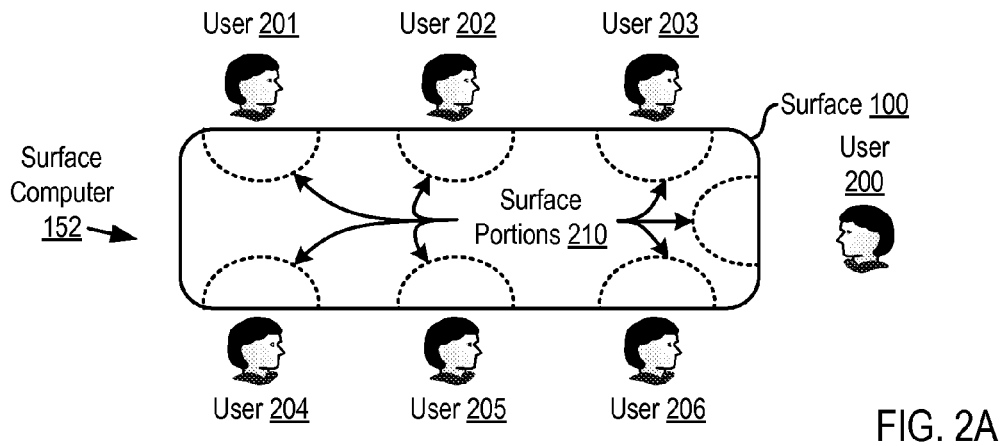
FIG. 2A sets forth a line drawing illustrating an exemplary surface useful in displaying speech for a user of a surface computer according to embodiments of the present invention.
Figure 2B:
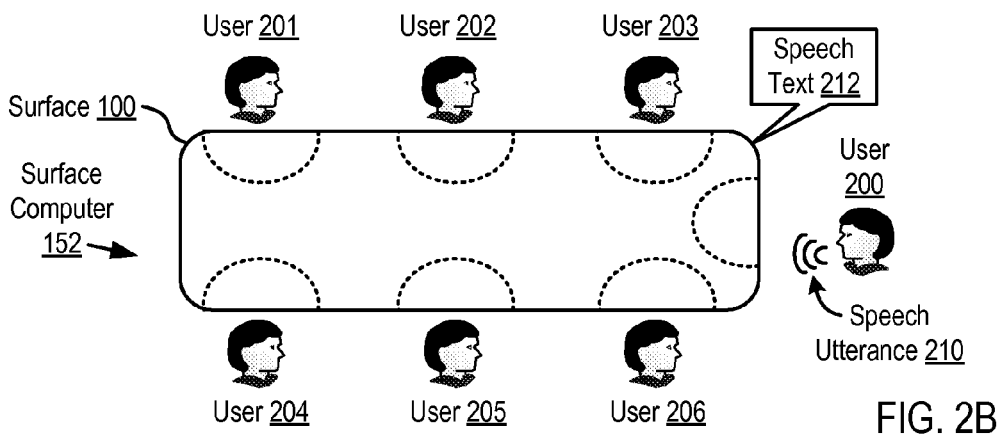
FIG. 2B sets forth a line drawing illustrating a further exemplary surface useful in displaying speech for a user of a surface computer according to embodiments of the present invention.

In FIG. 2B, the surface computer (152) detects a speech utterance (210) from user (200). The surface computer may detect the speech utterance (210) through one or more microphones included in the surface computer (152) and store the speech utterance (210) as digitally encoded speech. The surface computer (152) then determines speech text (212) using a speech engine in dependence upon the speech utterance (210). The speech text (212) of FIG. 2B is a textual representation of the speech utterance (210) detected by the surface computer (152). Consider, for example, that the users are managers of an organization having a meeting around the surface computer (152). In such an example, the surface computer (152) detects the following exemplary speech utterance spoken by the lead manager:

"Everyone find ways to increase profitability in your department. Next week bring a list of three ideas to accomplish this task to the meeting."

In this example, the surface computer (152) may determine the speech text from the speech utterance by passing the digitally encoded audio representation of the speech to a speech engine and receiving in return the following exemplary speech text:

Everyone find ways to increase profitability in your department. Next week bring a list of three ideas to accomplish this task to the meeting.

Figure 2C:
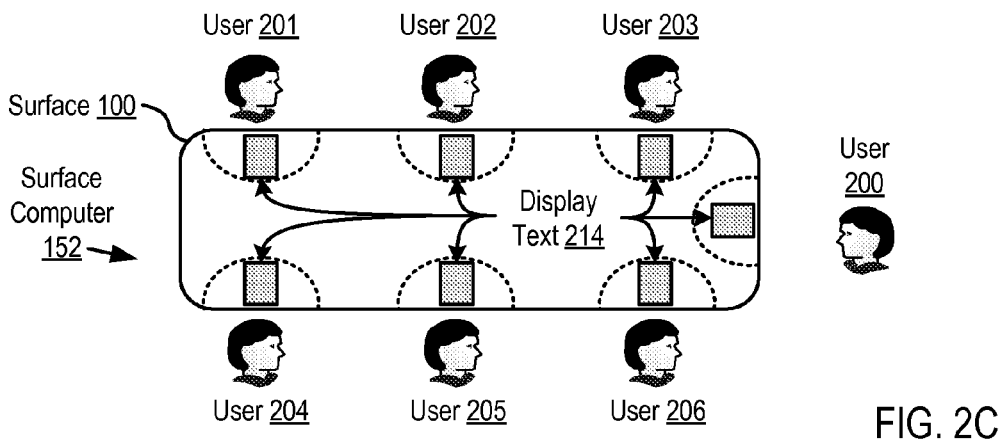
FIG. 2C sets forth a line drawing illustrating a further exemplary surface useful in displaying speech for a user of a surface computer according to embodiments of the present invention.

In FIG. 2C, the surface computer (152) creates display text (214) in dependence upon the speech text (212) and renders the display text (214) on each user's allocated portion of the surface (100). The display text (214) is the text that the surface computer (152) derives from the speech text (212) and renders on the surface (100). Continuing with the exemplary speech text above, the surface computer (152) may create the following exemplary display text:

TO DO:
(Everyone) Find ways to increase profitability in your department
(Next week) Bring a list of three ideas to accomplish this task to the meeting The exemplary display text above is a 'To Do' list based on the exemplary speech text above determined by the surface computer from the exemplary speech utterance above. The surface computer (152) creates the exemplary display text above by selecting one or more portions of the exemplary speech text as the display text using speech text selection and formatting rules. For example, in the creation of the exemplary display text above, the speech text selection and formatting rules specify listing each sentence as a task in the 'To Do' list. Because the exemplary speech text is composed of two sentences, the exemplary display text therefore is composed of two tasks. The exemplary speech text selection and formatting rules further specify that each task is composed of the verb and all of the grammatical elements following the verb in that task's corresponding sentence. For example, the first sentence of the exemplary speech text is "Everyone find ways to increase profitability in your department." The verb and all of the grammatical elements following the verb in that sentence are "find ways to increase profitability in your department," which is configured as the first task in the exemplary display text by the surface computer (152). The speech text selection and formatting rules also specify prepending in parenthesis each task with the noun and all the grammatical elements preceding the verb in that task's corresponding sentence. Continuing with the example from above, the noun and all the grammatical elements preceding the verb in the first sentence of the speech text is "Everyone," which is prepended by the surface computer (152) to the first task in the exemplary display text. Readers will note that the exemplary speech utterance, exemplary speech text, and exemplary display text above are for explanation and not for limitation.

Furthermore, readers will note that the surface computer may create display text based on the speech text in a variety of ways as will occur to those of skill in the art. As discussed above, the surface computer may create display text in dependence upon the speech text by selecting one or more portions of the speech text as the display text such as in the exemplary display text above. In some other embodiments, the surface computer may create display text in dependence upon the speech text by selecting the display text from a predefined display text repository in dependence upon one or more portions of the speech text. For example, consider that the surface computer detected the following speech utterance from one of the user's:

"Does anyone know anything about ticker symbol 'QQQQ'?"

Using the exemplary speech utterance, the surface computer (152) may identify the following speech text:

Does anyone know anything about ticker symbol QQQQ?

The surface computer (152) may then parse the exemplary speech text to determine that the exemplary speech text represents a question about a financial instrument having a ticker symbol 'QQQQ.' Using the 'QQQQ' portion of the exemplary speech text, the surface computer (152) may query a predefined display text repository implemented as a web-based financial database using the following exemplary URL:

http://www.financedata.com/q?s=QQQQ

The exemplary query above may return the following exemplary table in HTML that the surface computer (152) selects as the following exemplary display text:

| POWERSHARES QQQ | | | |
|---|---|---|---|
| Last Trade: | 49.12 | Day's Range | 48.73-49.17 |
| Trade Time: | 10:19 AM ET | 52 wk Range: | 42.06-50.66 |
| Change: | ▼0.06 (0.12%) | Volume: | 27,260,168 |
| Prev Close: | 49.18 | Avg Vol (3 mons): | 141,668,000 |
| Open: | 48.79 | YTD Return (Mkt)[2]: | 10.54% |
| Bid: | 49.13 × 68300 | Net Assets[2]: | 18.25B |
| Ask: | 49.14 × 117200 | P/E (ttm)[2]: | 21.07 |
| NAV[1]: | 48.93 | Yield (ttm)[2]: | 0.29% |

[1]As of 11-Sep-07
[2]As of 30-Jun-07

Figure 2D:
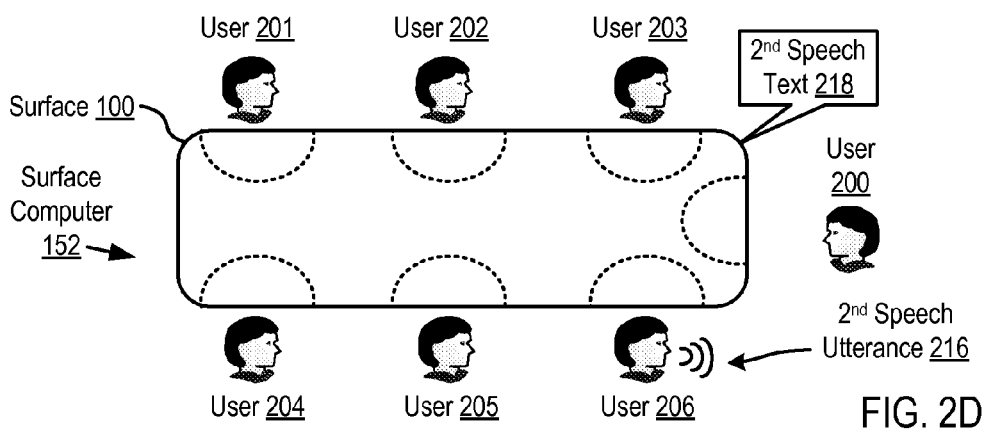
FIG. 2D sets forth a line drawing illustrating a further exemplary surface useful in displaying speech for a user of a surface computer according to embodiments of the present invention.

At any point in time after rendering the display text (214) on the surface (100), any of the users (200-206) may modify the display text (214) using an additional speech utterance. FIG. 2D, therefore, illustrates the surface computer (152) detecting a second speech utterance (216) from user (206). The surface computer detects the speech utterance (216) through one or more microphones included in the surface computer (152) and stores the speech utterance (216) as digitally encoded speech. The surface computer (152) then determines, using the speech engine, a second speech text (218) in dependence upon the second speech utterance (216). Continuing with the example from above in which the users are managers of an organization having a meeting around the surface computer (152) and the lead manager says, "Everyone find ways to increase profitability in your department. Next week bring a list of three ideas to accomplish this task to the meeting." In such an example, the surface computer (152) may detect the following exemplary second speech utterance by another manager:

"As a reminder, do not forget the company picnic that will occur in October."

In this example, the surface computer (152) may determine the second speech text from the second speech utterance by passing the digitally encoded audio representation of the speech to a speech engine and receiving in return the following exemplary second speech text:

As a reminder, do not forget the company picnic that will occur in October.

Figure 2E:
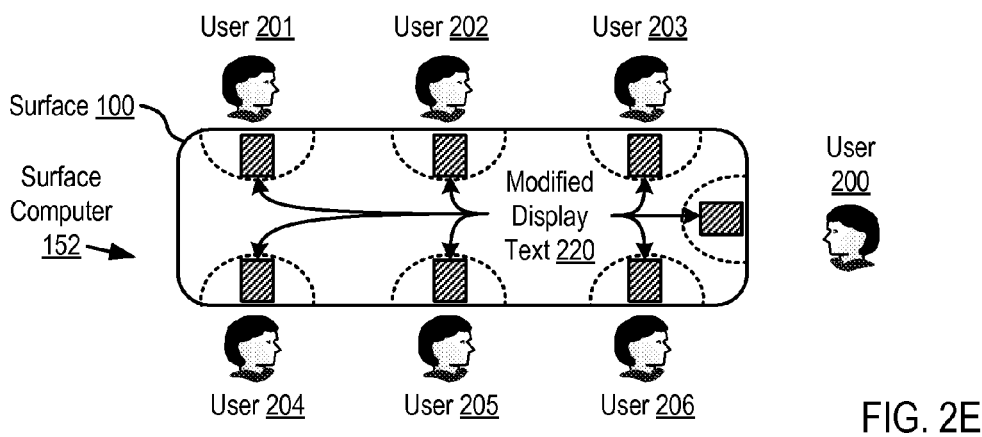
FIG. 2E sets forth a line drawing illustrating a further exemplary surface useful in displaying speech for a user of a surface computer according to embodiments of the present invention.

In FIG. 2E, the surface computer (152) modifies the current display text in dependence upon the second speech text (218) and renders the modified display text (220) on each user's allocated portion of the surface (100). The modified display text (220) is the text that the surface computer (152) derives from the second speech text (212) and the current display text. Continuing with the exemplary second speech text above, the surface computer (152) may modify the previous exemplary display text:

TO DO:
    (Everyone) Find ways to increase profitability in your department
    (Next week) Bring a list of three ideas to accomplish this task to the meeting into the following exemplary modified display text:

TO DO:
    (Everyone) Find ways to increase profitability in your department
    (Next week) Bring a list of three ideas to accomplish this task to the meeting
    (As a reminder) Do not forget the company picnic that will occur in October The exemplary modified display text above is implemented as a 'To Do' list in a manner similar to the exemplary display text above. The exemplary modified display text, however, includes an additional task "Do not forget the company picnic that will occur in October" derived from the exemplary second speech text, in turn derived from the exemplary second speech utterance. Readers will note that the exemplary second speech utterance, exemplary second speech text, and the exemplary modified display text (220) above are for explanation and not for limitation. Although in the example above, the second speech text is used modify the display text by adding additional information, readers will note that such a modification is for example only and not for limitation. In fact, the surface computer may modify the current display text by adding or subtracting display content such as, for example, text, graphics, videos, control widgets, and any other content capable of being displayed on the surface as will occur to those of skill in the art.

Figure 3A:
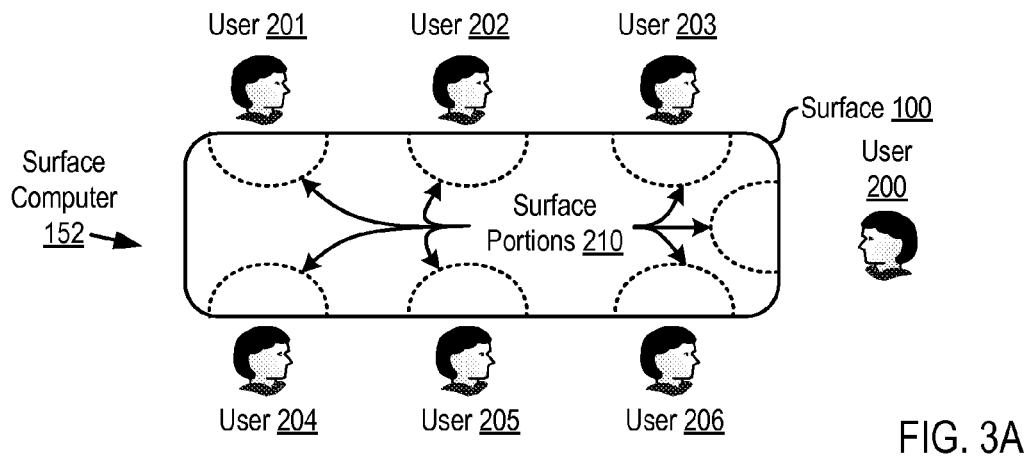
FIG. 3A sets forth a line drawing illustrating a further exemplary surface useful in displaying speech for a user of a surface computer according to embodiments of the present invention.
Figure 3B:
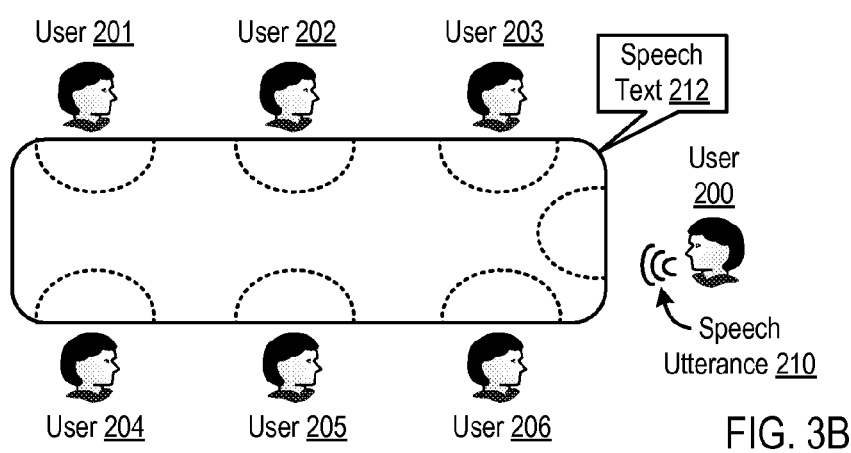
FIG. 3B sets forth a line drawing illustrating a further exemplary surface useful in displaying speech for a user of a surface computer according to embodiments of the present invention.
Figure 3C:
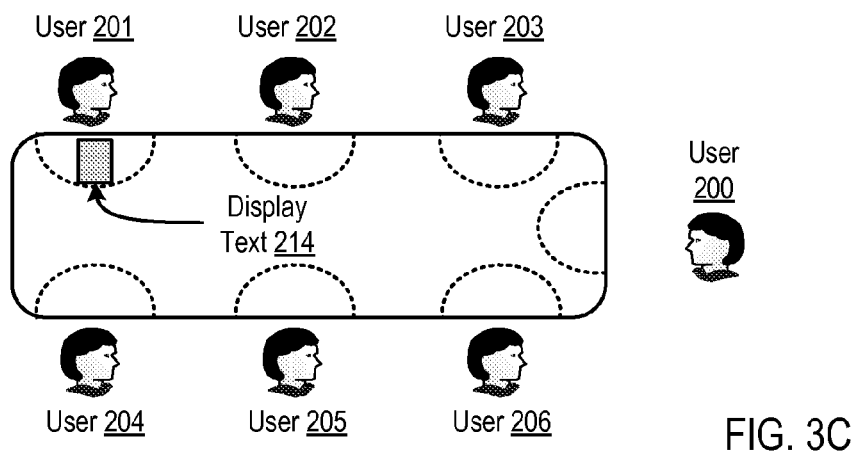
FIG. 3C sets forth a line drawing illustrating a further exemplary surface useful in displaying speech for a user of a surface computer according to embodiments of the present invention.

In the example of FIG. 2A-E, the surface computer renders the display text and the modified display text on the portion of the surface allocated to each of the users. In some other embodiments, however, the display text may be rendered on the portion of the surface allocated to the particular user to which the speech utterance is directed. For further explanation, FIGS. 3A-C set forth line drawings illustrating exemplary surfaces useful in displaying speech for a user of a surface computer according to embodiments of the present invention. The surface (100) of FIGS. 3A-C is comprised in a surface computer (152). The surface computer (152) is capable of receiving multi-touch input through the surface (100) and rendering display output on the surface (100).

In the examples of FIGS. 3A-E, several users (200-206) are positioned adjacent to the surface computer (152) for interaction through the surface (100). Each user (200-206) may choose their respective position around the surface computer (152) by choosing a chair in which to sit around the surface computer (152) or by merely standing near an edge of the surface (100). After the users (200-206) choose a location near the surface (100), the surface computer (152) registers the users (200-206) with the surface computer (152) and assigns a portion (210) of the surface (100) to each registered user (200-206) for interaction between that registered user (200-206) and the surface computer (152). Registering the users (200-206) with the surface computer (152) and allocating a portion (210) of the surface (100) to each registered user (200-206) is discussed in more detail below.

In FIG. 3B, the surface computer (152) detects a speech utterance (210) from user (200). The surface computer detects the speech utterance (210) through one or more microphones included in the surface computer (152) and stores the speech utterance (210) as digitally encoded speech. The surface computer (152) then determines speech text (212) using a speech engine in dependence upon the speech utterance (210). The speech text (212) of FIG. 3B is a textual representation of the speech utterance (210) detected by the surface computer (152). Consider, for example, that the users (200-206) are managers of an organization having a meeting around the surface computer (152). In such an example, the surface computer (152) detects the following exemplary speech utterance spoken by the lead manager:

"Bob, get Jim the financial statements from last quarter."

In this example, the surface computer (152) may determine the speech text from the speech utterance by passing the digitally encoded audio representation of the speech to a speech engine and receiving in return the following exemplary speech text:

Bob, get Jim the financial statements from last quarter.

In FIG. 3C, the surface computer (152) creates display text (214) in dependence upon the speech text (212). Continuing with the exemplary speech text above, the surface computer (152) may create the following exemplary display text:

TO DO:
  Get Jim the financial statements from last quarter

The exemplary display text above is a 'To Do' list based on the exemplary speech text above determined by the surface computer from the exemplary speech utterance above. Readers will note that the exemplary speech utterance, exemplary speech text, and exemplary display text above are for explanation and not for limitation.

In FIG. 3C, the surface computer (152) also determines to which particular user of the users (200-206) the speech utterance (210) is directed and renders the display text (214) on the portion of the surface (100) allocated to the particular user to which the speech utterance (210) is directed. In the example of FIG. 3C, the user (200) directs the speech utterance (210) to user (201). The surface computer (152) may determine to which particular user of the users (200-206) the speech utterance (210) is directed in any number of ways as will occur to those of skill in the art. The surface computer (152) may determine to which particular user of the users (200-206) the speech utterance (210) is directed by parsing the speech text (212) for the name of the user to which the speech utterance is directed. For example, the surface computer may parse the exemplary speech text above to determine that the speech utterance is directed to 'Bob.' In some other embodiments, the surface computer (152) may determine to which particular user of the users (200-206) the speech utterance (210) is directed by receiving an indication from the user (200) providing the speech utterance (210) through the surface (100). For example, as the user (200) speaks the speech utterance (210), the user (200) may use a gesture to select user (201) on the surface (100).

Figure 4:
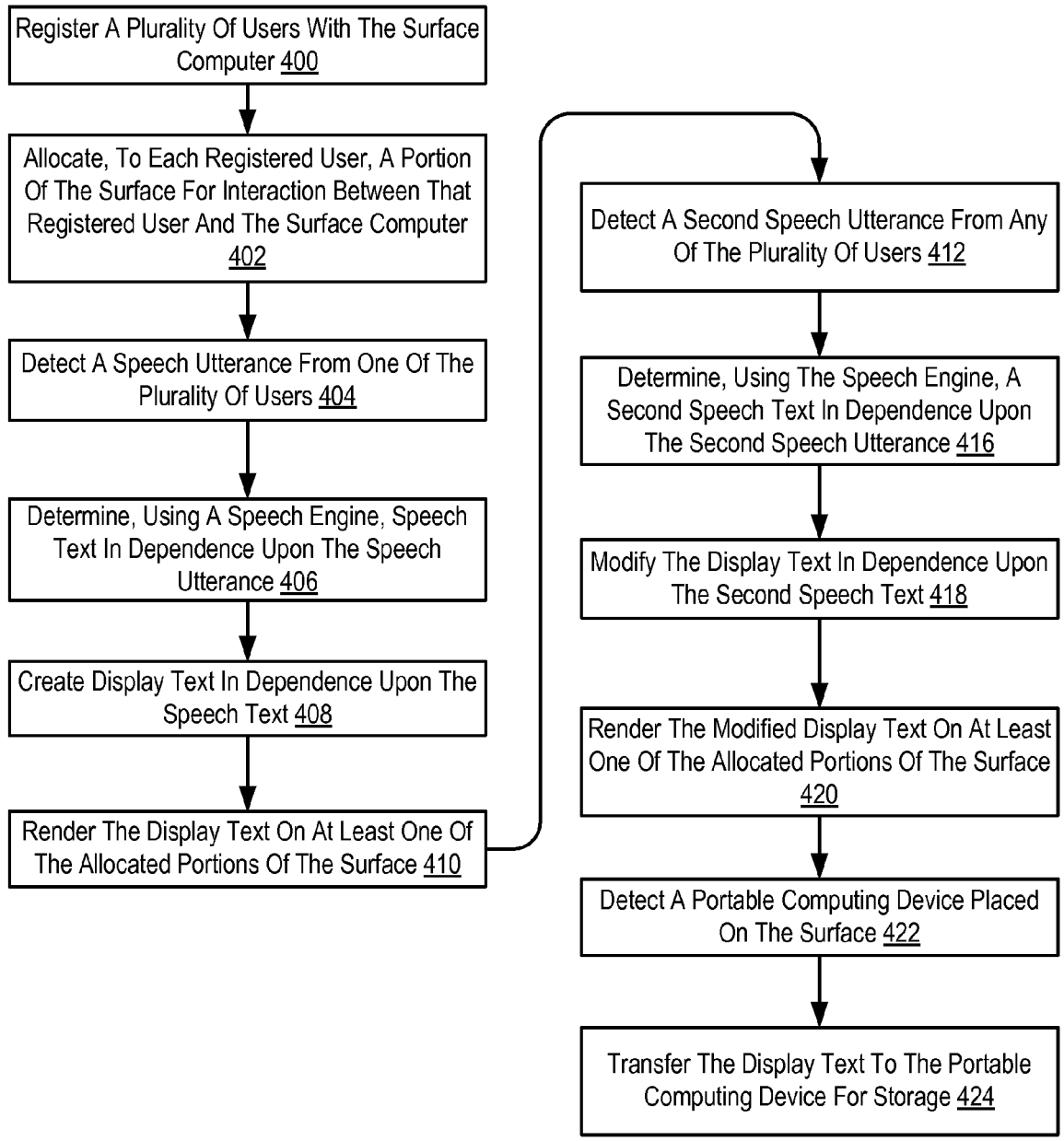
FIG. 4 sets forth a flow chart illustrating an exemplary method of displaying speech for a user of a surface computer according to embodiments of the present invention.

For further explanation of the present invention, FIG. 4 sets forth a flow chart illustrating an exemplary method of displaying speech for a user of a surface computer according to embodiments of the present invention. The surface computer described with reference to FIG. 4 includes a surface. The surface computer of FIG. 4 is capable of receiving multi-touch input through the surface and rendering display output on the surface.

The method of FIG. 4 includes registering (400), by the surface computer, a plurality of users with the surface computer. Registering (400) a plurality of users with the surface computer according to the method of FIG. 4 may be carried out by authenticating the identity of a user through the user's interaction with the surface computer and determining the user's authorization for using the surface computer. The authentication process may be carried out in variety of ways as will occur to those of skill in the art. For example, the surface computer may render a list of authorized users on the surface to allow the requesting user to select their name from the list. Upon selecting their name, the user may provide a password or other security tokens used for authentication. Consider another example, in which the users are all part of the same team in a company and are using the surface computer to conduct a team meeting. In such an example, the authentication process may be carried out by placing the user's company RFID badge on the surface so that the surface computer may identify the user by comparing security data retrieved from the user's company RFID badge with security data for the user stored in the company's employee database. Still further, other examples of authenticating a user may include the use of biometric authentication such as, for example, voice prints, retinal scans, or fingerprint matching, or the use of public-private key infrastructures.

After authenticating the user, the surface computer may determine the user's authorization for using the surface computer by retrieving access permissions for the authenticated user from the surface computer's authorization policy. The granularity of the access permissions may vary from one embodiment to another. For example, an authorization policy may provide either complete access to the surface computer or no access to the surface computer at all depending on the user's identity. In other embodiments, an authorization policy may provide access to view documents using the surface computer, but no authorization to add, modify, or delete documents. Readers will note that the authorization policy may not assign access permission directly to individual users. Rather, the authorization policy may assign access permissions to a group to which an individual user belongs.

The method of FIG. 4 also includes allocating (402), by the surface computer to each registered user, a portion of the surface for interaction between that registered user and the surface computer. Allocating (402), to each registered user, a portion of the surface for interaction between that registered user and the surface computer according to the method of FIG. 4 may be carried out by identifying a point on the surface that is adjacent to that registered user and defining a region around that identified point for use by that registered user to interact with the surface computer. The surface computer may identify a point on the surface that is adjacent to a registered user by instructing a user to touch the surface directly in front of that user and detecting the location of the user's touch though any number of multi-touch detection technologies such as, for example, surface image processing or frustrated total internal reflection. Other techniques for identifying a point on the surface that is adjacent to a registered user may include allocating a point on the surface that is adjacent to a registered user by detecting the user's position relative to the table through location triangulation using a set of microphones that capture the user's speech or proximity sensors.

The surface computer may define a region around that identified point by establishing a boundary around the identified point that extends from the edge of the surface toward the center of the surface. Combined with the edge of the surface, the boundary may resemble a rectangle, a semicircle, a triangle, or any other geometric shape. In some embodiments, the surface computer may render a line along the boundary of the region to aid the users in visualizing their portions of the surface through which they may interact with the surface computer. Once defined, the boundary used to define the region may be fixed or movable by the user. The user may move the boundary by manipulating the lines rendered on the surface using the user's fingers. For example, if the user wants a larger portion of the surface with which to interact with the surface computer, then the user may drag the boundary line defining the user's portion of the surface away from the user. The surface computer may detect the user's input, recognize the input as an adjustment to the user's boundary, reassign the surface portion to the user based on the boundary adjustment input, and redraw the boundary line at the edge of the user's allocated portion of the surface.

Readers will note that allocating (402), to each registered user, a portion of the surface for interaction between that registered user and the surface computer as described above is carried out using input from the users of the surface computer. In some other embodiments, however, allocating (402), to each registered user, a portion of the surface for interaction between that registered user and the surface computer may be carried out without any user intervention at all. The surface computer may assign a portion of the surface to each user based on user preferences provided in the user's profile such as, for example, the user's preferred location around the surface. The surface computer may retrieve the user's profile from a repository during the registration process described above. In other embodiments, a moderator may provide the surface computer with assignment instructions for each of the users around the surface. Readers will note that the surface computer may adjust the size of each user's allocated portion based on the surface size, the number of users sitting around the surface, and so on.

The method of FIG. 4 also includes detecting (404), by the surface computer, a speech utterance from one of the plurality of users. A speech utterance is an audio representation of the speech spoken by a user. The surface computer may detect (404) a speech utterance from one of the plurality of users according to the method of FIG. 4 by receiving audio input through one or more microphones and digitally encoding the received audio input using one or more audio codecs as described above.

The method of FIG. 4 includes determining (406), by the surface computer using a speech engine, speech text in dependence upon the speech utterance. Speech text is the textual representation of the speech spoken by a user. The surface computer may determine (406) the speech text in dependence upon the speech utterance according to the method of FIG. 4 by passing the digitally encoded speech utterance to an ASR engine of the speech engine through an API exposed by the speech engine and receiving in return the speech text from the ASR engine. Because ASR engine often generates the speech text using some form of statistical analysis, the ASR engine often returns a confidence level for the speech text. This confidence level represents the statistical probability that the speech text returned by the ASR engine in fact matches the speech utterance spoken by the user. Readers will note that in some embodiments, the ASR engine may return a set of speech texts, along with each speech text's associated confidence level, in response to the ASR engine receiving a single speech utterance. In such embodiments, the surface computer may determine (406) the speech text in dependence upon the speech utterance according to the method of FIG. 4 by selecting the speech text associated with the highest confidence level.

The method of FIG. 4 also includes creating (408), by the surface computer, display text in dependence upon the speech text. Display text is text for display on the surface that is derived from the speech text. In some embodiments where the surface computer depicts the speech of the users 'word-for-word', the display text is the speech text. In some other embodiments, however, the surface computer may create (408) the display text according to the method of FIG. 4 by selecting one or more portions of the speech text as the display text. For example, consider that the following exemplary speech text representing the speech spoken by a user:

Everyone find ways to increase profitability in your department. Next week bring a list of three ideas to accomplish this task to the meeting.

The surface computer may select the 'find ways to increase profitability in your department' and the 'bring a list of three ideas to accomplish this task to the meeting' portions of the exemplary speech text above along with other text and formatting as the following exemplary display text:

TO DO:
    Find ways to increase profitability in your department
    Bring a list of three ideas to accomplish this task to the meeting In still other embodiments, the surface computer may create (408) the display text according to the method of FIG. 4 by selecting the display text from a predefined display text repository in dependence upon one or more portions of the speech text. For example, consider that the following exemplary speech text representing the speech spoken by a user:

Does anyone know anything about ticker symbol QQQQ?

The surface computer (152) may then parse the exemplary speech text to determine that the exemplary speech text represents a question about a financial instrument having a ticker symbol 'QQQQ.' Using the 'QQQQ' portion of the exemplary speech text, the surface computer (152) may query a predefined display text repository implemented as a web-based financial database using the following exemplary URL:

http://www.financedata.com/q?s=QQQQ

The exemplary query above may return the following exemplary table in HTML that the surface computer (152) selects as the following exemplary display text:

| POWERSHARES QQQ | | | |
|---|---|---|---|
| Last Trade: | 49.12 | Day's Range | 48.73-49.17 |
| Trade Time: | 10:19 AM ET | 52 wk Range: | 42.06-50.66 |
| Change: | ▼0.06 (0.12%) | Volume: | 27,260,168 |
| Prev Close: | 49.18 | Avg Vol (3 mons): | 141,668,000 |
| Open: | 48.79 | YTD Return (Mkt)$^2$: | 10.54% |
| Bid: | 49.13 × 68300 | Net Assets$^2$: | 18.25B |
| Ask: | 49.14 × 117200 | P/E (ttm)$^2$: | 21.07 |
| NAV$^1$: | 48.93 | Yield (ttm)$^2$: | 0.29% |

$^1$As of 11-Sep-07
$^2$As of 30-Jun-07

Readers will note that the exemplary speech text and the exemplary display text illustrated above are for explanation only and not for limitation. Any speech text or display text as will occur to those of ordinary skill in the art may useful for displaying speech for a user of a surface computer according to embodiments of the present invention The method of FIG. 4 also includes rendering (410), by the surface computer, the display text on at least one of the allocated portions of the surface. The surface computer may render (410) the display text on at least one of the allocated portions of the surface according to the method of FIG. 4 by displaying the display text on the surface such that the top of the display text is oriented toward the center of the surface. Readers will note that the display text may be rendered within a particular program context or outside of any program context. In addition, the surface computer may format or arrange the display text according to any number of system parameters or user inputs such as, for example, the manner in which a user speaks the speech utterance corresponding to the particular display text or portion of the display text. Furthermore, readers will note that the display text may be saved in computer memory for subsequent access.

At any point in time after rendering (410) the display text on the surface, any of the users may modify the display text by speaking an additional speech utterance. The method of FIG. 4, therefore, includes detecting (412), by the surface computer, a second speech utterance from any of the plurality of users. The surface computer may detect (412) a second speech utterance from any of the plurality of users according to the method of FIG. 4 by receiving audio input through one or more microphones and digitally encoding the received audio input using one or more audio codecs as described above.

The method of FIG. 4 includes determining (414), by the surface computer using the speech engine, a second speech text in dependence upon the second speech utterance. The surface computer may determine (414) a second speech text in dependence upon the second speech utterance using the speech engine according to the method of FIG. 4 by passing the digitally encoded second speech utterance to an ASR engine of the speech engine through an API exposed by the speech engine and receiving in return the second speech text from the ASR engine.

The method of FIG. 4 includes modifying (418), by the surface computer, the display text in dependence upon the second speech text. The surface computer may modify (418) the display text in dependence upon the second speech text according to the method of FIG. 4 by adding or subtracting text to the current display text. Such text and whether it is added or subtracted to the current display text may be determined by the surface computer using the second speech text. For example, consider that the current display text is:

TO DO:
    Obtain the company financial statements for last quarter's
    Develop list of three ideas to make each company division more profitable and that the second speech text determined by the surface computer from a second speech utterance by one of the users is:

I've already obtained the company financial statements

As the surface computer parses the exemplary second speech text using a parsing ruleset, surface computer determines that it can remove the first task in the current display text illustrated above. As such, the surface computer modifies (418) the current display text to the following modified display text:

TO DO:
    Develop list of three ideas to make each company division more profitable The method of FIG. 4 also includes rendering (420), by the surface computer, the modified display text on at least one of the allocated portions of the surface. The surface computer may render (420) the modified display text on at least one of the allocated portions of the surface according to the method of FIG. 4 by displaying the modified display text on the surface such that the top of the display text is oriented toward the center of the surface.

The method of FIG. 4 also includes detecting (422), by the surface computer, a portable computing device placed on the surface. The surface computer may detect (422) a portable computing device placed on the surface according to the method of FIG. 4 using any number of multi-touch detection technologies such as, for example, surface image processing or frustrated total internal reflection. Using surface image processing to detect the portable computing device, for example, the surface computer analyzes an image of the surface to identify the computing device using pattern recognition software. After recognizing the computing device, the surface computer may retrieve connection information from a device data repository used to establish data communications with the computing device placed on the surface. To aid identification of the portable computing device, a small infrared tag may be affixed to the device that provides the surface computer with a device identifier for the device.

Using frustrated total internal reflection technology to identify the computer device, for example, the surface computer is able to detect that a device is placed on the surface. Upon detecting that the device is place on the surface of the surface computer, the surface computer may interrogate the device to retrieve data communication connection information. In some embodiments, the portable computing device may have affixed to it an RFID tag that the surface computer may use to retrieve a device identifier for the device, which in turn may be used by the surface computer to retrieve data communication connection information from a device data repository.

The method of FIG. 4 includes transferring (424), by the surface computer, the display text to the portable computing device for storage. The surface computer may transfer (424) the display text to the portable computing device for storage according to the method of FIG. 4 by establishing a data communication connection using the information retrieved upon detecting the portable computing device and sending a copy of the display text to the portable computing device though the data communications connect. Readers will note that in some embodiments, the surface computer may determine whether the user is authorized to store a copy of the display on the user's portable computing device and only permit the transfer of the display text to the device if the user is authorized. Similarly, the surface computer may determine whether the portable computing device itself is authorized or capable of storing a copy of the display text and only permit the transfer of the display text to the device if the device is authorized.

Although the description above with reference to FIG. 4 describes an exemplary embodiment in which the display text is transferred to a portable computing device for storage, readers will note that this embodiment is for explanation and not for limitation. In other embodiments, readers will note that the display text may be transmitted to another computer device through a network such as, for example, a wide area network ('WAN'), local area network ('LAN'), the Internet, and so on.

To better aid the surface computer in recognizing speech from various users, the surface computer may configure a speech engine with individual recognition characteristics tailored for each user utilizing the surface computer. For example, the surface computer may configure a speech engine optimized to recognize a user with an Indian accent and configure another speech engine optimized to recognize a user with a New York accent. In such manner, the surface computer's ability to recognize the speech spoken by each user of the surface computer may be greatly improved. For further explanation, therefore, consider FIG. 5 that sets forth a flow chart illustrating a further exemplary method of displaying speech for a user of a surface computer according to embodiments of the present invention. The surface computer described with reference to FIG. 5 includes a surface. The surface computer of FIG. 5 is capable of receiving multi-touch input through the surface and rendering display output on the surface.

Figure 5:
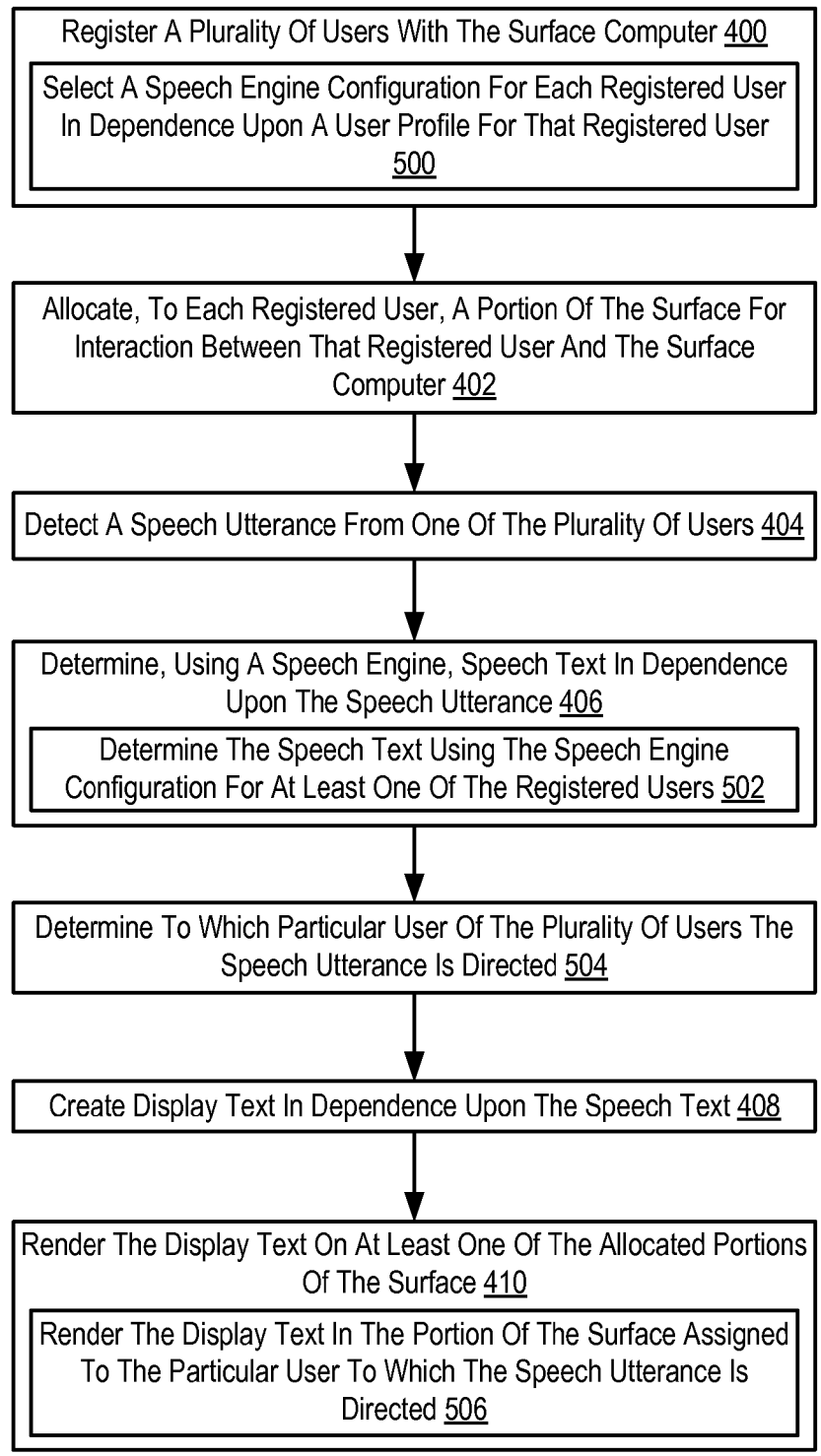
FIG. 5 sets forth a flow chart illustrating a further exemplary method of displaying speech for a user of a surface computer according to embodiments of the present invention.

The method of FIG. 5 is similar to the method of FIG. 4. That is, the method of FIG. 5 includes: registering (400), by the surface computer, a plurality of users with the surface computer; allocating (402), by the surface computer to each registered user, a portion of the surface for interaction between that registered user and the surface computer; detecting (404), by the surface computer, a speech utterance from one of the plurality of users; determining (406), by the surface computer using a speech engine, speech text in dependence upon the speech utterance; creating (408), by the surface computer, display text in dependence upon the speech text; and rendering (410), by the surface computer, the display text on at least one of the allocated portions of the surface.

The method of FIG. 5 differs from the method of FIG. 4 in that registering (400), by the surface computer, a plurality of users with the surface computer according to the method of FIG. 5 includes selecting (500) a speech engine configuration for each registered user in dependence upon a user profile for that registered user. A speech engine configuration specifies the acoustic model, lexicon, grammar (if any), and any other configuration parameters used by a speech engine to perform voice services such as recognition and synthesis. The surface computer may select (500) a speech engine configuration for each registered user according to the method of FIG. 5 by retrieving each user's profile from a profile repository after identifying that user during the registration process with the surface computer and caching that user's speech engine configuration parameters specified in that user's profile for use in initializing a speech engine tailored for that individual user. The users' profiles may be previously stored in the profile repository by some other computer system in any manner as will occur to those of skill in the art. The surface computer may then utilize the cached speech engine configuration parameters to initialize a speech engine optimized to provide voice services for that particular user.

In the method of FIG. 5, determining (406), by the surface computer using a speech engine, speech text in dependence upon the speech utterance includes determining (502) the speech text using the speech engine configuration for at least one of the registered users. The surface computer may determine (502) the speech text using the speech engine configuration for at least one of the registered users according to the method of FIG. 5 by passing the digitally encoded speech utterance to the speech engine for the particular user providing the speech utterance through an API exposed by that speech engine and receiving in return the speech text from that user's speech engine. The surface computer may identify the speech engine to use in determining the speech text by detecting the originating location of the speech utterance using a set of microphones and a triangulation algorithm, identifying the portion of the surface closest to the detected origin of the speech utterance, and utilizing the speech engine for the user allocated to that portion to recognize the speech utterance. In some other embodiments, the surface computer may determine (502) the speech text using the speech engine configuration for at least one of the registered users according to the method of FIG. 5 by passing the speech utterance to each user's personalized speech engine, retrieving speech text and confidence levels from each of the speech engines, and selecting the speech text having the highest confidence level.

The method of FIG. 5 also includes determining (504), by the surface computer, to which particular user of the plurality of users the speech utterance is directed. The surface computer may determine (504) to which particular user of the plurality of users the speech utterance is directed according to the method of FIG. 5 in any number of ways as will occur to those of skill in the art. The surface computer may determine (504) to which particular user of the users the speech utterance is directed by parsing the speech text for the name of the user to which the speech utterance is directed. For example, the surface computer may parse the exemplary speech text "Bob, get Jim the financial statements from last quarter" to determine that the speech utterance is directed to 'Bob.' In some other embodiments, the surface computer may determine (504) to which particular user of the users the speech utterance is directed by receiving an indication from the user providing the speech utterance through the surface. For example, as the user speaks the speech utterance "Bob, get Jim the financial statements from last quarter," the speaker may use a gesture to select 'Bob' on the surface.

In the method of FIG. 5, rendering (410), by the surface computer, the display text on at least one of the allocated portions of the surface includes rendering (506) the display text in the portion of the surface allocated to the particular user to which the speech utterance is directed. The surface computer may render (506) the display text in the portion of the surface allocated to the particular user to which the speech utterance is directed according to the method of FIG. 4 by displaying the display text on that user's allocated surface portion such that the top of the display text is oriented toward the center of the surface.

Readers will note that displaying speech for a user of a surface computer according to embodiments of the present invention as described above advantageously allows for seamless depiction of the speech among users of a surface computer. Displaying speech for a user of a surface computer according to embodiments of the present invention as described above incorporates the spatial relationship of users around the surface computer and has the ability to track the speech of users as they verbally interact around the surface computer in multiple contexts.

Exemplary embodiments of the present invention are described largely in the context of a fully functional computer system for displaying speech for a user of a surface computer. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of displaying text derived from speech for a user of a surface computer, the surface computer comprising a surface, the surface computer capable of receiving multi-touch input through the surface and rendering display output on the surface, the method comprising:
   registering, by the surface computer, a plurality of users with the surface computer, including selecting a speech engine configuration for each registered user in dependence upon a user profile for that registered user;
   allocating, by the surface computer to each registered user, a portion of the surface for interaction between that registered user and the surface computer;
   detecting, by the surface computer, a speech utterance from one of the plurality of users;
   determining, by the surface computer using a speech engine, speech text in dependence upon the speech utterance, including determining the speech text using the speech engine configuration for at least one of the registered users;
   creating, by the surface computer, display text in dependence upon the speech text; and
   rendering, by the surface computer, the display text on at least one of the allocated portions of the surface.

2. The method of claim 1 wherein:
   the method further comprises determining, by the surface computer, to which particular user of the plurality of users the speech utterance is directed; and
   rendering, by the surface computer, the display text on at least one of the allocated portions of the surface further comprises rendering the display text in the portion of the surface allocated to the particular user to which the speech utterance is directed.

3. The method of claim 1 further comprising:
   detecting, by the surface computer, a second speech utterance from any of the plurality of users;
   determining, by the surface computer using the speech engine, a second speech text in dependence upon the second speech utterance;
   modifying, by the surface computer, the display text in dependence upon the second speech text; and
   rendering, by the surface computer, the modified display text on at least one of the allocated portions of the surface.

4. The method of claim 1 wherein creating, by the surface computer, display text in dependence upon the speech text further comprises selecting one or more portions of the speech text as the display text.

5. The method of claim 1 wherein creating, by the surface computer, display text in dependence upon the speech text further comprises selecting the display text from a predefined display text repository in dependence upon one or more portions of the speech text.

6. The method of claim 1 further comprises:
   detecting, by the surface computer, a portable computing device placed on the surface; and
   transferring, by the surface computer, the display text to the portable computing device for storage.

7. A surface computer for displaying text derived from speech for a user of a surface computer, the surface computer comprising a surface, the surface computer capable of receiving multi-touch input through the surface and rendering display output on the surface, the surface computer comprising a computer processor, a computer memory operatively coupled to the computer processor, the computer memory having disposed within it computer program instructions capable of:
   registering, by the surface computer, a plurality of users with the surface computer, including selecting a speech engine configuration for each registered user in dependence upon a user profile for that registered user;
   allocating, by the surface computer to each registered user, a portion of the surface for interaction between that registered user and the surface computer;
   detecting, by the surface computer, a speech utterance from one of the plurality of users;
   determining, by the surface computer using a speech engine, speech text in dependence upon the speech utterance, including determining the speech text using the speech engine configuration for at least one of the registered users;
   creating, by the surface computer, display text in dependence upon the speech text; and
   rendering, by the surface computer, the display text on at least one of the allocated portions of the surface.

8. The surface computer of claim 7 wherein:
   the computer memory has disposed within it computer program instructions capable of determining, by the surface computer, to which particular user of the plurality of users the speech utterance is directed; and
   rendering, by the surface computer, the display text on at least one of the allocated portions of the surface further comprises rendering the display text in the portion of the surface allocated to the particular user to which the speech utterance is directed.

9. The surface computer of claim 7 wherein computer memory has disposed within it computer program instructions capable of:
   detecting, by the surface computer, a second speech utterance from any of the plurality of users;
   determining, by the surface computer using the speech engine, a second speech text in dependence upon the second speech utterance;
   modifying, by the surface computer, the display text in dependence upon the second speech text; and
   rendering, by the surface computer, the modified display text on at least one of the allocated portions of the surface.

10. The surface computer of claim 7 wherein computer memory has disposed within it computer program instructions capable of:
   detecting, by the surface computer, a portable computing device placed on the surface; and
   transferring, by the surface computer, the display text to the portable computing device for storage.

11. A computer program product for displaying text derived from speech for a user of a surface computer, the surface computer comprising a surface, surface computer capable of receiving multi-touch input through the surface and rendering display output on the surface, the computer program product disposed in a recordable computer readable medium, the computer program product comprising computer program instructions capable of:

registering, by the surface computer, a plurality of users with the surface computer, including selecting a speech engine configuration for each registered user in dependence upon a user profile for that registered user;

allocating, by the surface computer to each registered user, a portion of the surface for interaction between that registered user and the surface computer;

detecting, by the surface computer, a speech utterance from one of the plurality of users;

determining, by the surface computer using a speech engine, speech text in dependence upon the speech utterance, including determining the speech text using the speech engine configuration for at least one of the registered users;

creating, by the surface computer, display text in dependence upon the speech text; and rendering, by the surface computer, the display text on at least one of the allocated portions of the surface.

12. The computer program product of claim 11 wherein:
the computer program product further comprises computer program instructions capable of determining, by the surface computer, to which particular user of the plurality of users the speech utterance is directed; and rendering, by the surface computer, the display text on at least one of the allocated portions of the surface further comprises rendering the display text in the portion of the surface allocated to the particular user to which the speech utterance is directed.

13. The computer program product of claim 11 further comprising computer program instructions capable of:

detecting, by the surface computer, a second speech utterance from any of the plurality of users;

determining, by the surface computer using the speech engine, a second speech text in dependence upon the second speech utterance;

modifying, by the surface computer, the display text in dependence upon the second speech text; and rendering, by the surface computer, the modified display text on at least one of the allocated portions of the surface.

14. The computer program product of claim 11 wherein creating, by the surface computer, display text in dependence upon the speech text further comprises selecting one or more portions of the speech text as the display text.

15. The computer program product of claim 11 wherein creating, by the surface computer, display text in dependence upon the speech text further comprises selecting the display text from a predefined display text repository in dependence upon one or more portions of the speech text.

* * * * *